United States Patent
Inoue

(10) Patent No.: US 9,813,565 B2
(45) Date of Patent: Nov. 7, 2017

(54) IMAGE FORMING APPARATUS

(71) Applicant: KYOCERA Document Solutions Inc., Osaka (JP)

(72) Inventor: Takashi Inoue, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 15/359,455

(22) Filed: Nov. 22, 2016

(65) Prior Publication Data
US 2017/0155774 A1 Jun. 1, 2017

(30) Foreign Application Priority Data
Nov. 30, 2015 (JP) ................. 2015-233639

(51) Int. Cl.
| H04N 1/00 | (2006.01) |
| G03G 15/00 | (2006.01) |
| G06K 1/00 | (2006.01) |
| G06K 9/00 | (2006.01) |
| H04N 1/60 | (2006.01) |

(52) U.S. Cl.
CPC ....... *H04N 1/00037* (2013.01); *G03G 15/556* (2013.01); *G06K 9/00503* (2013.01); *G06K 9/00543* (2013.01); *H04N 1/00023* (2013.01); *H04N 1/00904* (2013.01); *H04N 1/00994* (2013.01); *H04N 2201/0094* (2013.01)

(58) Field of Classification Search
CPC .......... H04N 1/00037; H04N 1/00023; H04N 1/00904; H04N 1/00994; H04N 2201/0094; G03G 15/556; G06K 9/00543
See application file for complete search history.

(56) References Cited

U.S. PATENT DOCUMENTS

2003/0020936 A1* 1/2003 Nakajima .......... H04N 1/32561
358/1.9
2007/0268503 A1* 11/2007 Seki .......................... G06T 5/20
358/1.9

FOREIGN PATENT DOCUMENTS

| JP | 2001-194960 | 7/2001 |
| JP | 2004-109471 | 4/2004 |

* cited by examiner

*Primary Examiner* — Quang N Vo

(57) ABSTRACT

Plural sensors are arranged respectively for plural toner colors, and oscillate to generate and output detection signals with frequencies corresponding to toner densities using oscillator circuits. An analog switch selects one detection signal among the detection signals. A filter decreases amplitude of the selected detection signal. A first signal line transmits the detection signal with the decreased amplitude. A comparator compares the transmitted detection signal with a predetermined threshold value and outputs as the detection signal a signal of which a level is set as a high level or a low level in accordance with the comparison result, and thereby increases amplitude of the detection signal. A receiver-side IC receives the detection signal with the increased amplitude at a predetermined port, determines a frequency of the received detection signal, and determines the toner density on the basis of the determined frequency.

6 Claims, 3 Drawing Sheets

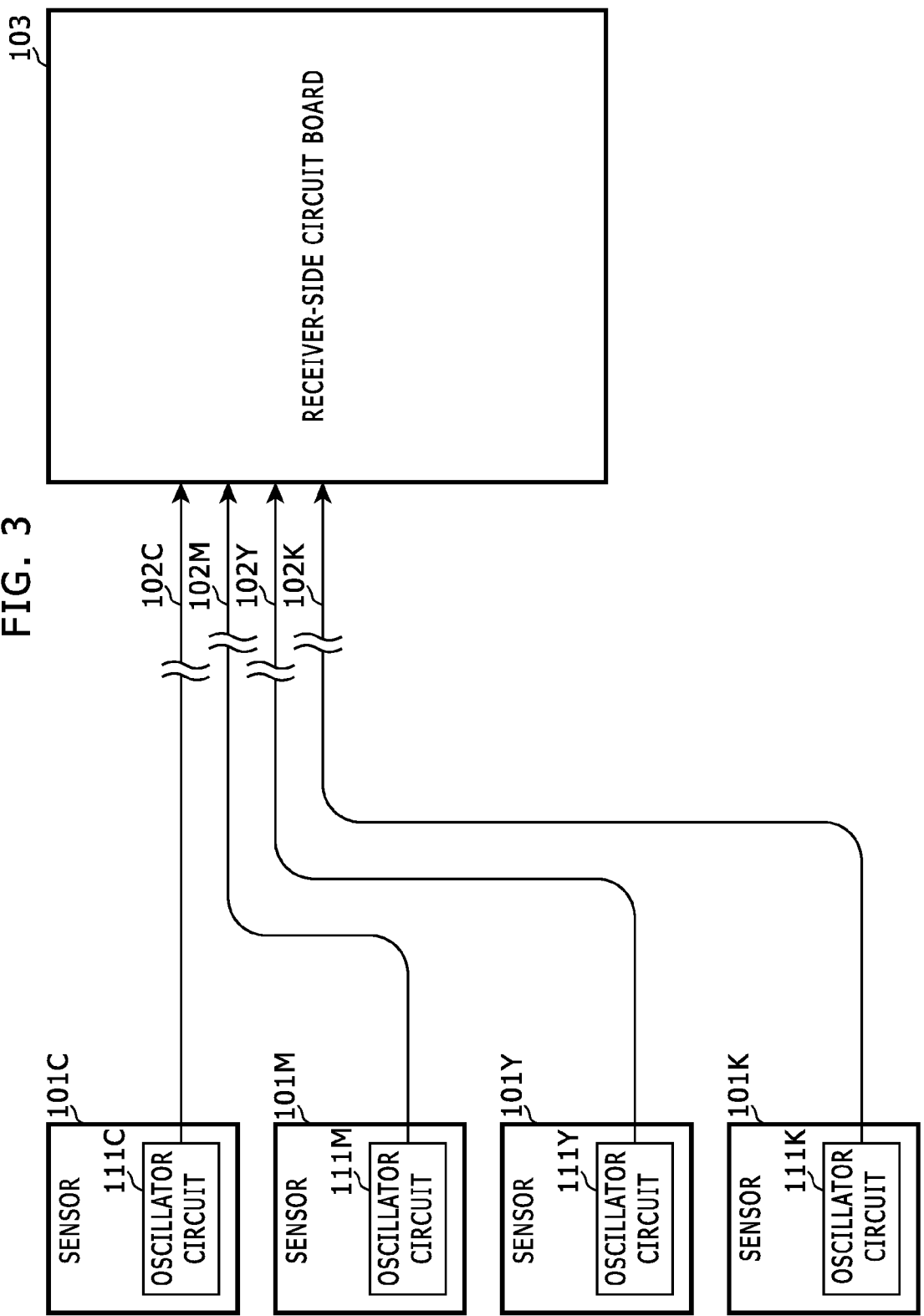

IMAGE FORMING APPARATUS

CROSS-REFERENCE TO RELATED APPLICATIONS

This application relates to and claims priority rights from Japanese Patent Application No. 2015-233639, filed on Nov. 30, 2015, the entire disclosures of which are hereby incorporated by reference herein.

BACKGROUND

1. Field of the Present Disclosure

The present disclosure relates to an image forming apparatus.

2. Description of the Related Art

An image forming apparatus supplies electricity to only one of plural toner density detection sensors in a development device unit side and causes the residual not to operate, and thereby reduces EMI (ElectroMagnetic Interference) noise.

For example, the toner density detection sensor oscillates to generate a detection signal with a frequency corresponding to a toner density using an oscillator circuit.

FIG. 3 shows a block diagram that indicates an example of a configuration of a typical image forming apparatus. For example, as shown in FIG. 3, when four detection signal are detected by oscillator circuits 111C, 111M, 111Y and 111K in sensors 101C, 101M, 101Y and 101K, and transmitted to a receiver-side circuit board 102 through four signal lines 102C, 102M, 102Y and 102K arranged side by side with each other, crosstalk occurs among the signal lines 102C, 102M, 102Y and 102K, and consequently causes respective frequencies of the detection signals, i.e. toner densities, not to be detected properly in the receiver-side circuit board 102.

In the aforementioned image forming apparatus, the development device unit side and a main body side that includes a controller are directly connected to each other using a connector, and therefore no signal lines are used between the development device unit side and the main body. Further, the aforementioned image forming apparatus performs switching electric power supply to the plural toner density detection sensors, and it may cause switching noise to occur at turning on/off of the electric power supply. Furthermore, until the oscillator circuits gets stable after starting the electric power supply, it is difficult to measure the toner densities properly.

SUMMARY

An image forming apparatus according to an aspect of the present disclosure includes plural sensors, an analog switch, a filter, a first signal line, a comparator and a receiver-side integrated circuit. The plural sensors (a) are arranged respectively for plural toner colors and (b) are configured to oscillate to generate and output detection signals with frequencies corresponding to toner densities using oscillator circuits. The analog switch is configured to select one detection signal among the detection signals outputted from the plural sensors. The filter is configured to decrease amplitude of the detection signal selected by the analog switch. The first signal line is configured to transmit the detection signal of which the amplitude has been decreased by the filter. The comparator is configured to compare the detection signal transmitted by the first signal line with a predetermined threshold value and output as the detection signal a signal of which a level is set as a high level or a low level in accordance with the comparison result, and thereby increase amplitude of the incoming detection signal transmitted by the first signal line. The receiver-side integrated circuit is configured to (a) receive at a predetermined port the detection signal of which the amplitude has been increased by the comparator, (b) determine a frequency of the detection signal on the basis of levels of the received detection signal and (c) determine the toner density on the basis of the determined frequency.

These and other objects, features and advantages of the present disclosure will become more apparent upon reading of the following detailed description along with the accompanied drawings.

BRIEF DESCRIPTION OF THE DRAWINGS

FIG. 3 shows a block diagram that indicates an example of a configuration of a typical image forming apparatus.

DETAILED DESCRIPTION

Hereinafter, an embodiment according to an aspect of the present disclosure will be explained with reference to drawings.

Figure 1:
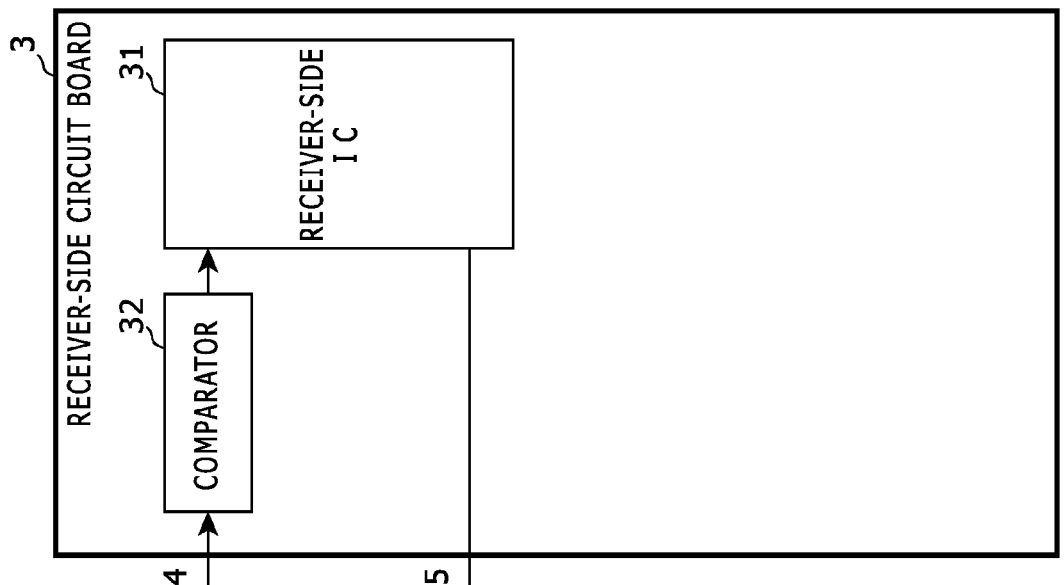
FIG. 1 shows a block diagram that indicates a configuration of an image forming apparatus according to an embodiment of the present disclosure.
Figure 1:
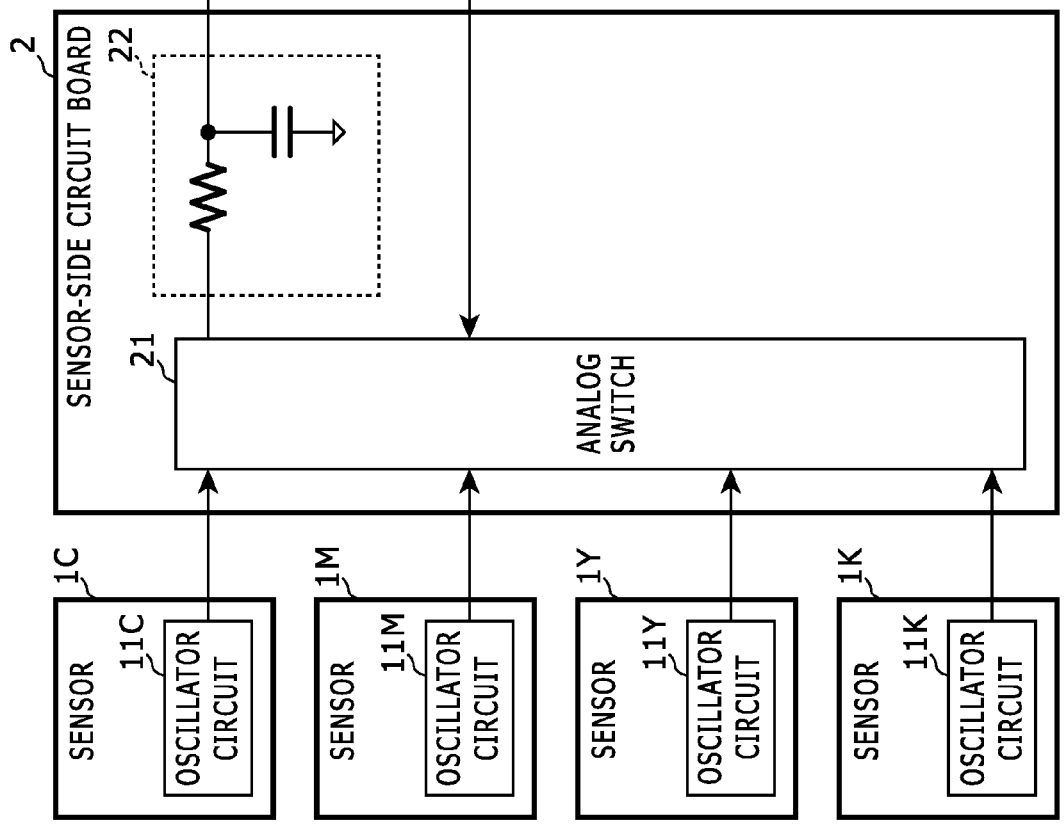

FIG. 1 shows a block diagram that indicates a configuration of an image forming apparatus according to an embodiment of the present disclosure. The image forming apparatus shown in FIG. 1 is an apparatus such as a printer, a multi function peripheral or a copier that performs color printing in an electrographic manner using toner of four colors (Cyan, Magenta, Yellow and Black), and includes sensors 1C, 1M, 1Y and 1K, a sensor-side circuit board 2, a receiver-side circuit board 3, a signal line 4 and a signal line 5.

The sensor 1C is a toner density sensor that (a) is arranged in/on a development device to which Cyan toner is supplied and (b) oscillates to generate and output a detection signal with a frequency corresponding to a toner density of Cyan toner using an oscillator circuit 11C.

The sensor 1M is a toner density sensor that (a) is arranged in/on a development device to which Magenta toner is supplied and (b) oscillates to generate and output a detection signal with a frequency corresponding to a toner density of Magenta toner using an oscillator circuit 11M.

The sensor 1Y is a toner density sensor that (a) is arranged in/on a development device to which Yellow toner is supplied and (b) oscillates to generate and output a detection signal with a frequency corresponding to a toner density of Yellow toner using an oscillator circuit 11Y.

The sensor 1K is a toner density sensor that (a) is arranged in/on a development device to which Black toner is supplied and (b) oscillates to generate and output a detection signal with a frequency corresponding to a toner density of Black toner using an oscillator circuit 11K.

Figure 2:
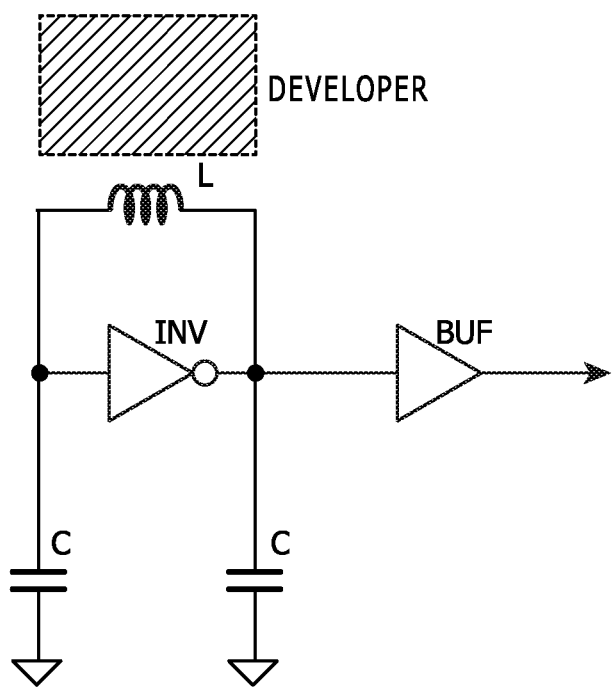
FIG. 2 shows a circuit diagram that an example of a configuration of an oscillator circuit 11C, 11M, 11Y or 11K shown in FIG. 1.

FIG. 2 shows a circuit diagram that an example of a configuration of an oscillator circuit 11C, 11M, 11Y or 11K shown in FIG. 1.

The oscillator circuit 11C, 11M, 11Y or 11K is a Colpitts oscillator in which (a) an invertor INV generates a rectangular wave with a resonance frequency due to an inductance of an inductor L and a capacitance of a capacitor C, and a buffer BUF outputs the rectangular wave. The inductance of the inductor varies due to change of a toner density in two-component developer. Specifically, the two-component developer includes non-magnetic toner and magnetic carrier, and therefore a lower toner density results in a higher carrier density, and consequently the inductance of the inductor L increases. Contrarily, when the toner density gets high, the carrier density relatively gets low, and consequently the inductance of the inductor L decreases. Therefore, the aforementioned resonance frequency varies due to change of the toner density.

It should be noted that a configuration of the oscillator circuit 11C, 11M, 11Y or 11K is not limited to that shown in FIG. 2 and another type of an oscillator circuit may be used as the oscillator circuit 11C, 11M, 11Y or 11K.

Returning to FIG. 1, the sensor-side circuit board 2 includes an analog switch 21 and a filter 22.

The analog switch 21 selects one detection signal among the detection signals outputted respectively from the sensors 1C, 1M, 1Y and 1K. For example, an analog switch IC is used as the analog switch 21. The sensors 1C, 1M, 1Y and 1K continuously output the detection signals, respectively, and the analog switch 21 selects one detection signal among these detection signals.

The filter 22 is a filter that decreases amplitude (i.e. a peak-to-peak value) of the detection signal selected by the analog switch 21. In this embodiment, the filter is a high-cut filter that includes a resistance and a capacitor, and a cutoff frequency thereof is set as a frequency higher than a range from a frequency of the detection signal corresponding to a lowermost value of the aforementioned toner density to a frequency of the detection signal corresponding to an uppermost value of the toner density.

The receiver-side circuit board 3, for example, is a controller circuit board that controls internal devices such as the development device, and includes a receiver-side integrated circuit (hereinafter, called "receiver-side IC") 31 and a comparator 32.

The receiver-side IC 31, for example, is a controller IC that performs control of toner supply from a toner cartridge to the development device, and the like, and (a) receives at a predetermined port the detection signal of which the amplitude has been increased by the comparator 32, (b) determines a frequency of the detection signal on the basis of levels of the received detection signal, and (c) determines the toner density on the basis of the determined frequency. For example, the receiver-side IC 31 performs control of toner supply from a toner cartridge to the development device on the basis of the determined toner density, and thereby controls a toner amount in the development device.

Further, the receiver-side IC 31 outputs a selection signal that specifies a detection signal to be obtained among the detection signals of the sensors 1C, 1M, 1Y and 1K, and thereby transmits the selection signal through the signal line 5 to the analog switch 21. The analog switch 21 selects the detection signal from the sensor specified by the incoming selection signal.

The comparator 32 compares the incoming detection signal transmitted by the signal line 4 with a predetermined threshold value and outputs as the detection signal to the receiver-side IC 31 a signal of which a level is set as a high level (here, a voltage level of electric power supply of the receiver-side circuit board 3) or a low level (here, a ground level of the receiver-side circuit board 3) in accordance with the comparison result, and thereby increases amplitude of the incoming detection signal transmitted by the signal line 4.

In this embodiment, the filter 22 decreases the amplitude of the detection signal to a predetermined lowermost value (i.e. a lowermost value of a peak-to-peak value of the detection signal) that enables the receiver-side IC 31 to detect the high level and the low level of the detection signal to be inputted to the port; and the comparator 32 increases the amplitude of the detection signal to be equal to or larger than the lowermost value.

The signal line 4 is a signal line that electronically connects the sensor-side circuit board 2 and the receiver-side circuit 3 board to each other, and is a first signal line that transmits the detection signal of which the amplitude has been decreased by the filter 22 (i.e. the detection signal selected by the analog switch 21).

The signal line 4 is longer than a transmission path of the detection signals from the sensors 1C, 1M, 1Y and 1K to the analog switch 21. In other words, the sensor-side circuit board 2 is arranged so as to make the transmission path of the detection signals from the sensors 1C, 1M, 1Y and 1K to the analog switch 21 shorter than the signal line that connects the sensor-side circuit board 2 and the receiver-side circuit 3 board to each other.

Further, the signal line 5 is a signal line that electronically connects the sensor-side circuit board 2 and the receiver-side circuit 3 board to each other, and is a second signal line that transmits the aforementioned selection signal.

For example, a part or all of signal lines in a flexible flat cable that connects the sensor-side circuit board 2 and the receiver-side circuit 3 board to each other are used as the signal lines 4 and 5.

The following part explains a behavior of the aforementioned image forming apparatus.

The sensors 1C, 1M, 1Y and 1K continuously output the detection signals with frequencies corresponding to current toner densities using the oscillator circuits 11C, 11M, 11Y and 11K, respectively.

The receiver-side IC 31 selects one toner color in a predetermined order and outputs the selection signal that specifies the detection signal of the selected one toner color, and transmits the selection signal through the signal line 5 to the analog switch 21.

The analog switch 21 selects the detection signal from the sensor specified by the selection signal, and outputs the selected detection signal to the filter 22. Subsequently, the detection signal of which the amplitude has been decreased is transmitted through the signal line 4.

The comparator 32 increases the amplitude of the incoming detection signal transmitted through the signal line 4 and thereafter supplies the detection signal to a predetermined port of the receiver-side IC 31.

The receiver-side IC 31 detects a voltage level of the port and thereby receives the detection signal, and determines a frequency of the detection signal on the basis of change of the voltage level, and on the basis of the determined frequency, determines a toner density of the toner color specified by the selection signal.

For example, if the determined toner density is less than a predetermined value, then the receiver-side IC 31 drives a toner transportation unit such as a toner transportation screw and thereby supplies toner from a toner cartridge to a development device.

Afterward, for another toner color, the receiver-side IC 31 performs outputting the selection signal, receiving the detection signal, and determining the toner density. In such a manner, the receiver-side IC 31 determines toner densities of the plural toner colors repeatedly in a predetermined order.

As mentioned, in the aforementioned embodiment, the plural sensors 1C, 1M, 1Y and 1K (a) are arranged respectively for plural toner colors and (b) oscillate to generate and output detection signals with frequencies corresponding to toner densities using the oscillator circuits 11C, 11M, 11Y and 11K. The analog switch 21 selects one detection signal among the detection signals outputted respectively from the plural sensors 1C, 1M, 1Y and 1K. The filter 22 decreases amplitude of the detection signal selected by the analog switch 21. The signal line 4 transmits the detection signal of which the amplitude has been decreased by the filter 22. The comparator 32 compares the detection signal transmitted by the signal line 4 with a predetermined threshold value and outputs as the detection signal a signal of which a level is set as a high level or a low level in accordance with the comparison result, and thereby increases amplitude of the incoming detection signal transmitted by the signal line 4. The receiver-side IC 31 (a) receives at a predetermined port the detection signal of which the amplitude has been increased by the comparator 32, (b) determines a frequency of the detection signal on the basis of levels of the received detection signal and (c) determines the toner density on the basis of the determined frequency.

Consequently, while restraining crosstalk and EMI noise on the signal line, the toner density is properly measured through the signal line. Further, only a small number of signal lines are required to connect the sensor-side circuit board 2 and the receiver-side circuit board 3 to each other, and consequently a space for the signal lines between the sensor-side circuit board 2 and the receiver-side circuit board 3 gets small.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
    plural sensors (a) arranged respectively for plural toner colors and (b) configured to oscillate to generate and output detection signals with frequencies corresponding to toner densities using oscillator circuits;
    an analog switch configured to select one detection signal among the detection signals outputted from the plural sensors;
    a filter configured to decrease amplitude of the detection signal selected by the analog switch;
    a first signal line configured to transmit the detection signal of which the amplitude has been decreased by the filter;
    a comparator configured to compare the detection signal transmitted by the first signal line with a predetermined threshold value and output as the detection signal a signal of which a level is set as a high level or a low level in accordance with the comparison result, and thereby increase amplitude of the incoming detection signal transmitted by the first signal line; and
    a receiver-side integrated circuit configured to (a) receive at a predetermined port the detection signal of which the amplitude has been increased by the comparator, (b) determine a frequency of the detection signal on the basis of levels of the received detection signal and (c) determine the toner density on the basis of the determined frequency.

2. The image forming apparatus according to claim 1, wherein:
    the filter decreases the amplitude of the detection signal to a predetermined lowermost value, the lowermost value enabling the receiver-side integrated circuit to detect the high level and the low level; and
    the comparator increases the amplitude of the detection signal to be equal to or larger than the lowermost value.

3. The image forming apparatus according to claim 1, wherein:
    the detection signal is a rectangular wave;
    the filter is a high-cut filter; and
    a cutoff frequency of the high-cut filter is a frequency higher than a range from a frequency of the detection signal corresponding to a lowermost value of the toner density to a frequency of the detection signal corresponding to an uppermost value of the toner density.

4. The image forming apparatus according to claim 1, further comprising a second signal line;
wherein:
    the receiver-side integrated circuit outputs a selection signal;
    the second signal line transmits the selection signal;
    the analog switch selects the detection signal from the sensor specified by the transmitted selection signal.

5. The image forming apparatus according to claim 1, further comprising:
    a sensor-side circuit board and
    a receiver-side circuit board;
wherein:
    the first signal line is a signal line that electronically connects the sensor-side circuit board and the receiver-side circuit board to each other;
    the analog switch and the filter are built on the sensor-side circuit board; and
    the comparator and the receiver-side integrated circuit are built on the receiver-side circuit board.

6. The image forming apparatus according to claim 1, wherein the first signal line is longer than a transmission path of the detection signal from the plural sensors to the analog switch.

* * * * *